Aug. 28, 1951　　　H. W. AVERY　　　2,566,051
CONTROL VALVE
Filed May 23, 1947
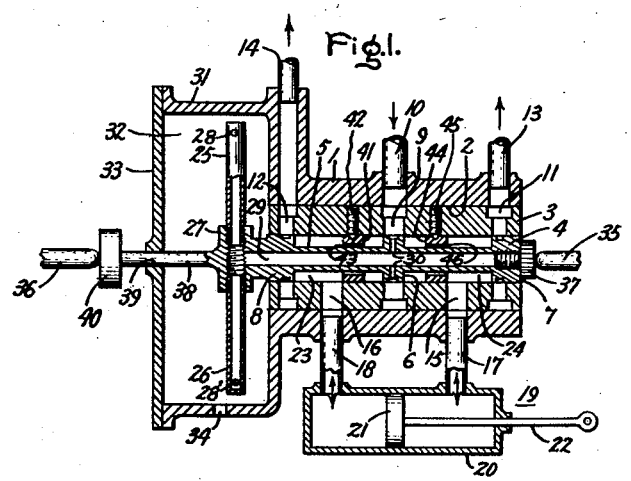
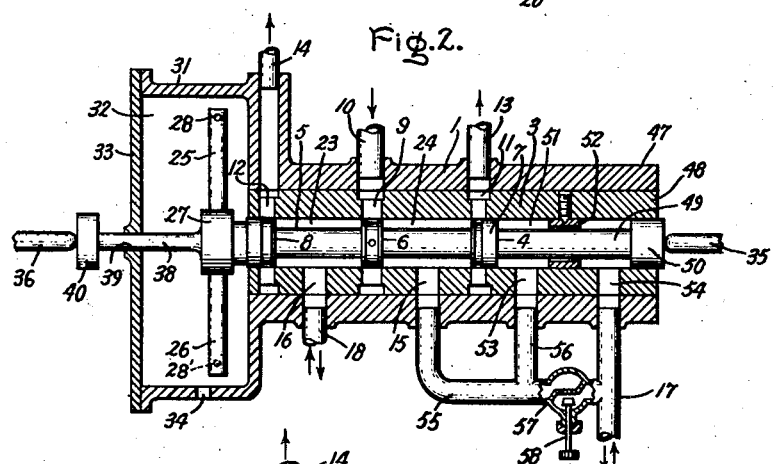
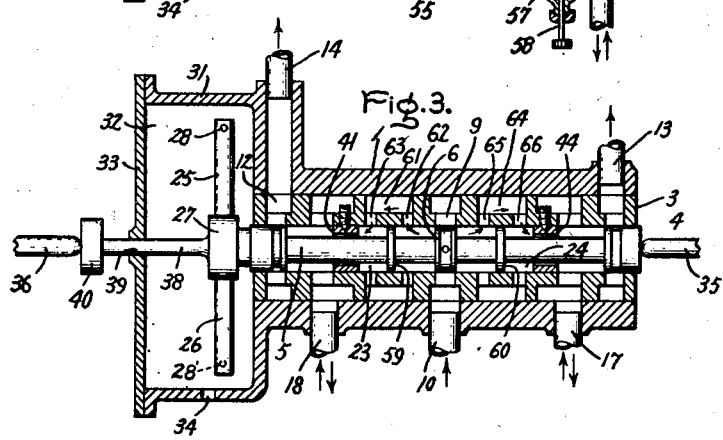
Inventor:
Howard W. Avery,
by *Clarke H. Mott*
His Attorney.

Patented Aug. 28, 1951

2,566,051

UNITED STATES PATENT OFFICE 2,566,051

CONTROL VALVE

Howard W. Avery, Schenectady, N. Y., assignor to General Electric Company, a corporation of New York Application May 23, 1947, Serial No. 750,119

6 Claims. (Cl. 251—139)

The present invention relates to a control valve and more particularly to a control valve of the type utilized to control the flow of fluid under pressure to a servomotor or other fluid pressure utilization device.

At the present time hydraulic servomotors are widely used in servo systems for actuating a controlled device in accordance with control signals which are usually of a small order of magnitude. In some cases the servomotor is controlled by a hydraulic control valve, sometimes referred to as a transfer valve, operated by electric solenoids which are in turn energized by an electronic amplifier controlled by the electric signals. For example, such an arrangement is shown as part of an automatic pilot control system in the disclosure of Patent 2,416,097, Hansen et al., wherein hydraulic servomotors are used to actuate the control surfaces of aircraft in accordance with electric signals derived from gyroscope-actuated Selsyn signal generators.

So long as the fluid pressures controlled by the transfer valve are not too high, the necessary solenoid power for actuating the valve can be conveniently obtained from solenoids and an electronic amplifier of reasonable size. This proved to be the case in automatic pilot systems of the type disclosed in the above-mentioned Hansen et al. patent, where fluid pressures of the order of 150 pounds per square inch were used. In many servo system applications, however, there is a need for hydraulic servomotors which will deliver greater power output and in order to accomplish this it is desirable to go to higher fluid pressures, for example, in the range of 1000 to 2000 pounds per square inch. However, when such high operating pressures are used with conventional control valves, the reaction and friction forces in the valve are so high that operating solenoids and servo amplifiers of impractical size and weight are required.

An object of the present invention is to provide an improved control valve for controlling hydraulic servomotors and the like.

A further object of the invention is to provide a control valve which will satisfactorily control fluids under high pressure with the application of only a small amount of operating force.

A further object of the invention is to provide an improved control valve wherein friction and valve reaction forces are greatly reduced or eliminated entirely.

Further objects and advantages of my invention will become apparent as the following description proceeds and the features of novelty which characterize my invention will be pointed out with particularity in the claims annexed to and forming a part of this specification.

For a better understanding of my invention reference should be made to the following detailed description taken in connection with the accompanying drawing in which:

Fig. 1 is a cross sectional view of a hydraulic control valve embodying the friction reducing and reaction eliminating feature of my invention.

Fig. 2 shows a variant of the invention having an arrangement for varying the amount of valve reaction compensation, and Fig. 3 is a modification of the arrangement shown in Fig. 1 with which improved results may be obtained under certain operating conditions.

Referring to Fig. 1 of the drawing, I have shown my invention as embodied in the hydraulic control valve comprising a cylindrical casing I having a central bore 2 in which is received a hollow cylindrical sleeve member 3. Located within the hollow sleeve member 3 is a valve member 4 comprising a stem 5 from which extend a center land 6 and two outer lands 7 and 8. The casing I and sleeve 3 are provided with a center port 9 which is connected to a source of hydraulic fluid under pressure (not shown) by means of a conduit 10. The casing I and the sleeve 3 are provided with additional ports II and 12 which are connected respectively by means of conduits 13 and 14 to the drain connection of the hydraulic system, i. e., to the low pressure portion of the hydraulic circulating system, which in the usual arrangement feeds the inlet of the pressure pump.

The casing I and the sleeve 3 are also provided with two additional ports 15 and 16 which are connected by means of conduits 17 and 18 to a pressure utilizaton device such as a hydraulic servomotor. In order to give a clearer illustration of the operation of the valve, a hydraulic servomotor 19 of the push-pull type is shown in schematic form. The servomotor 19 is shown as comprising a stationary cylinder 20 the opposite ends of which are connected to the control valve through the conduits 17 and 18. Located within the cylinder 20 is a piston 21 connected to a piston shaft 22, which is caused to move in one direction or the other, depending upon which way the control valve is displaced from the neutral position.

It will be noted that the port 15 is located between the lands 6 and 7 and the port 16 is located between the lands 6 and 8. It will also be noted that when the valve member 4 is in the neutral position shown the center land 6 closes the inlet port 9 and the outer lands 7 and 8 respectively close the drain ports 11 and 12. Thus when the control valve is in the neutral position no oil is permitted to flow through the control valve and the servomotor 19 remains stationary. When the valve member 4 is displaced to the right, inlet port 9 is opened permitting fluid to flow in the space or chamber 23 defined by the valve stem 5, the sleeve 3, and the lands 6 and 8. After flowing through the chamber 23 the fluid passes out port 16 and into the left-hand end of the servomotor cylinder 20. The piston 21 of the servomotor then moves to the right. When this occurs fluid trapped on the right-hand side of the piston 21 is forced up through conduit 17 and port 15 into a chamber 24 defined by the valve stem 5, the sleeve 3, and the lands 6 and 7. Since the land 7 is now displaced to the right from the position shown the fluid passes through the chamber 24 and out port 11 and conduit 13 to the drain.

When the valve member 4 is displaced to the left from the position shown, the reverse action takes place. Thus when this occurs fluid under pressure flows from the conduit 10 through the port 9, through chamber 24, port 15 and conduit 17 into the right-hand end of the servomotor cylinder 20 causing the piston 21 to move to the left. Fluid trapped on the left side of the piston 21 is then forced out through conduit 18, port 16, into chamber 23. Since the land 8 is now displaced to the left from the position shown, the fluid passes out of chamber 23 through port 12 and conduit 14 back to the drain. Thus it will be seen that by moving the valve member 4 to the right or to the left from the neutral position, movement of the servomotor shaft 22 to the right or left is produced.

The control valve as thus far described is entirely conventional and is of a type widely used to control hydraulic servomotors. As pointed out above, valves of this type are quite satisfactory for operation at low pressures, but when it is desired to use high pressures to obtain high power output of the servomotor, difficulty is encountered due to friction and valve reaction. According to my invention, which will now be described, novel constructional features are added to the conventional valve to reduce or eliminate valve friction and valve reaction.

For the purpose of eliminating static valve friction I provide a hydraulic motor of the jet reaction type which is arranged to cause a continuous rotation of the valve member 4 and the attached lands 6, 7 and 8. The reaction motor comprises a pair of hollow tubes 25 and 26 which are inserted into a hollow hub 27 formed on the left-hand end of the valve member 4. The tubes 25 and 26 extend radially from the hub 27 and have located adjacent their ends openings 28 and 28' through which hydraulic oil under pressure escapes and provides a rotative torque by jet reaction. In order to supply hydraulic oil to the motor tubes 25 and 26, the valve stem 5 is made hollow by means of a drilling forming a central passageway 29. Oil from the pressure line 10 passes into the passageway 29 through radial drillings 30 provided in the center land 6. Thus it will be seen that the hydraulic motor will cause the valve member 4 to rotate continuously, thereby eliminating static friction between the lands 6, 7 and 8 and the inner surface of the sleeve member 3.

The left-hand end of the casing 1 is enlarged at 31 to provide a chamber 32 for collecting oil ejected from the orifices 28 and 28' of the reaction motor. The chamber 32 is closed by a suitable end plate 33. Oil is removed from chamber 32 by means of a drain opening 34 which may be connected back to the drain of the hydraulic system by a suitable conduit (not shown).

The valve member 4 may be conveniently actuated in either direction by means of a pair of opposed solenoids of the type shown in the above-mentioned Hansen et al. patent, the ends of the armatures being indicated at 35 and 36. The armature 35 is shown as engaging a stub member 37 attached to the right-hand end of the valve member 4, and the stub member may, as shown, be threaded into the passageway 29 to provide a convenient closure for the right-hand end of the drilling.

In order to provide an engaging surface for the left-hand solenoid armature 36, a shaft extension 38 of the valve member 4 is provided which extends through a central aperture 39 in the end plate 33 and carries at its outer extremity an enlargement 40 against which the end of the armature 36 bears.

Turning now to the matter of valve reaction, it has been found that in valves of the type described, there is a reaction force which tends to move the valve back to the neutral position once it has been displaced in either direction from neutral. In high pressure valves this reaction force is of very considerable magnitude so that high power operating solenoids and servo amplifier are required to operate the valve. It is believed that this reaction force is caused by acceleration of the oil squirting through the port 9 into either chamber 23 or 24 past the edge of the center land 6. For example, if valve member 4 is displaced to the right, high pressure oil flows through the port 9 past the left-hand edge of the land 6 into the chamber 23 in which a certain hydraulic pressure then exists. This hydraulic pressure reacts against the land 8 tending to move the valve member to the left and also reacts against the land 6 tending to move the valve member to the right. Since the land areas facing both ends of the chamber 23 are equal, these two opposed forces would cancel out if the pressures at both ends of the chamber were the same. However, due to the fact that the oil entering the chamber 23 adjacent the center land 6 is moving in high velocity, it undergoes a momentary reduction in pressure so that the hydraulic force exerted on the adjacent land 6 is somewhat less than the opposing force exerted on the end land 8, and as a result there is a net force tending to restore the valve member 4 to the center or neutral position.

In order to eliminate or reduce this valve reaction I provide a flow-restricting device in the flow path of the oil controlled by the valve and make use of the resulting difference in hydraulic pressures on the upstream and downstream sides of the flow restricting device to provide a valve biasing force in a direction to compensate for the valve reaction. In the arrangement shown in Fig. 1 of the drawing the flow restricting device is in the form of an annular ring 41 which is secured inside the sleeve 3 between the center land 6 and the port 16 by means of a setscrew 42. The inner diameter of the ring 41 is slightly larger than the outer diameter of the valve stem 5 so as to provide a small clearance space 43 through which the oil must flow in passing from the center port 9 to the discharge port 16. Because of the fact that the oil in flowing through the small clearance space 43 undergoes a drop in pressure, the pressure in chamber 23 adjacent the end land 8 is less than the pressure in the right-hand end of the chamber adjacent the center land 6. The lands 6 and 8, therefore, act as piston means responsive to the differential pressure on the opposite sides of the flow restricting device and it will be clear that by adjusting the pressure drop through the clearance space 43 the net biasing force exerted on the lands may be made equal and opposite to that caused by valve reaction. In the illustrated arrangement the pressure drop through the clearance space 43 may be initially set by a proper selection of the radial clearance or the length of the restricted passageway or both.

When the valve member is displaced to the left, the valve reaction is in the opposite direction and tends to move the valve member to the right back to the neutral position. In order to compensate for valve reaction in this direction another flow restricting device is provided in the chamber 24 between the center land 6 and the port 15. This flow restricting device may be of the same construction as the one previously described and is shown as comprising another annular ring 44 held in position by means of setscrew 45, the inner diameter of the ring being selected so as to provide a clearance space 46 through which the oil must flow in passing from the left to the right-hand end of chamber 24. The operation of this flow-restriction device is identical to that previously described and it will be clear that because of the pressure drop therethrough the pressure relationship in the left and right-hand ends of the chamber 24 is altered causing a change in reaction force exerted against the surface of the lands 6 and 7 facing the ends of chamber 24. Here again by selecting the proper pressure drop through the clearance space 46, valve reaction tending to oppose movement of valve 4 may be reduced or eliminated.

For some applications, it has been found that improved results can be obtained if the flow restricting device is separated from the center land 6 and the high velocity streams of oil adjacent thereto. One way in which this may be accomplished is shown in the modification of Fig. 2 of the drawing. Referring to Fig. 2 it will be noted that the casing 1, the sleeve 3, and the valve member 4 are provided with extensions on the right-hand side numbered 47, 48 and 49, respectively. Located on the right-hand end of the valve extension 49 is an additional land 50 which together with the land 7 forms a supplemental fluid chamber 51 in which is located a flow restricting device 52 similar in construction and operation to the flow restricting devices 41 and 44 previously described. There are also provided additional ports 53 and 54 which open into the chamber 51 on opposite sides of the flow restricting device 52. In this arrangement the ports 15 and 53 are interconnected by conduits 55 and 56 and the port 54 is connected to the right-hand end of the servomotor 19 through the conduit 17. For the purpose of by-passing some of the fluid flow around the flow-restricting device 52 there is provided a by-pass conduit 57 interconnecting the conduits 55 and 17. Located in the conduit 57 is a valve 58 by means of which the fluid flow through the by-pass conduit may be adjusted for the purpose of varying the amount of valve reaction compensation.

The operation of the modification shown in Fig. 2 of the drawing is as follows: When the valve member 4 is displaced to the left, oil under pressure from the conduit 10 flows through the port 9 into chamber 24, through port 15 and into conduit 55. From conduit 55 part of the oil passes upwardly through conduit 56 and port 53 into the left-hand end of chamber 51. From the left-hand end of the chamber 51, the oil flows past the flow-restricting device 52 into the right-hand end of chamber 51 from which it leaves through port 54 and enters conduit 17 through which it travels to the right-hand end of the servomotor cylinder 20, causing movement of the servomotor piston 21 to the left. Part of the oil flowing in conduit 55 is by-passed around the flow-restricting device 52 through conduit 57, the amount of this by-pass flow being determined by the adjustment of the valve 58. Oil trapped on the left-hand side of piston 21 is forced upwardly through conduit 18, chamber 23, port 12 and conduit 14 to the drain in the same manner as described in connection with Fig. 1.

When the valve member 4 is displaced to the right it will be clear that the reverse action takes place by causing oil to flow past the flow-restricting device 52 and the by-pass 57 in the opposite direction.

In this modification it will be clear that the flow-restricting device 52 will cause a pressure differential to be exerted on the lands 7 and 50 whereby a biasing force will be exerted on the valve member 4 in a direction to compensate for valve reaction regardless of which way the valve member is displaced from the neutral position. If greater compensating force is desired the valve 58 is moved towards the closed position causing more fluid to flow past the flow-restricting device 52 whereby the pressure differential and compensating force are increased. On the other hand if less compensation is desired, the valve 58 is opened permitting more oil to flow through the by-pass conduit 57. Less oil then flows through the flow-restricting device and there is less pressure differential thereacross resulting in less compensating force.

In Fig. 3 of the drawing there is shown another arrangement for separating the flow-restricting means from the high velocity oil stream adjacent the center land 6. For this purpose the valve stem 5 is provided with two additional lands or dams 59 and 60, located, respectively, between the center land 6 and the flow restricting device 41 and between the center land 6 and the flow-restricting device 44. The land 59 forces oil entering the center port 9 to reach chamber 23 by way of an auxiliary chamber 61 formed by grooving the sleeve member 3. Oil enters the chamber 61 by way of drillings 62 and leaves the chamber by way of drillings 63. By thus providing a circuitous route for the incoming oil, the velocity change effects are largely eliminated by the time the oil reaches the chamber 23 in which the flow-restricting device 41 is located.

In a similar manner the land 60 causes the oil entering through port 9 to reach the chamber 24 by way of an auxiliary chamber 64. Oil enters the chamber 64 through drillings 65 and leaves the chamber through drillings 66. In other respects the modification of Fig. 3 is the same as that shown and described in connection with Fig. 1. It will, of course, be obvious that in the embodiments of either Fig. 1 or 3 an adjustable flow bypass valve such as the valve 58 in the structure of Fig. 2 could be provided to bypass the flow restricting devices 41 and 44 and to thereby provide a means for adjusting the compensating forces.

In view of the foregoing it will be apparent that I have provided a novel control valve in which the friction and valve reaction forces are greatly reduced or eliminated, permitting the valve to be operated with very low operating forces and thereby opening up a new field of high pressure control valve application in servo systems. Normally the amount of valve reaction compensation is adjusted to substantially eliminate the effect of valve reaction. However, tests have shown that my compensation arrangement is very flexible and that the pressure drop through the flow restriction may be adjusted to give either under compensation or over compensation, as desired.

While I have shown and described particular embodiments of my invention, it will occur to those skilled in the art that various changes and modifications may be made without departing from my invention, and I therefore aim in the appended claims to cover all such changes and modifications as fall within the true spirit and scope of my invention.

What I claim as new and desire to secure by Letters Patent of the United States is:

1. In a fluid control valve, a sleeve member having a first port adapted to be connected to a source of fluid pressure and a second port adapted to be connected to a fluid pressure operated device, a slide valve member having a pair of spaced lands disposed on opposite sides of said second port, one of said lands normally closing said first port but being movable with said valve member to uncover said first port to permit flow of fluid between said ports through a passageway defined by said sleeve member, said valve member and said two lands, and a flow restricting device disposed in said passageway between said ports, said flow restricting device altering the relationship of the opposed fluid pressure forces exerted on said two lands whereby compensation for valve reaction is obtained.

2. In a fluid control valve, a stationary member provided with ports therein, a valve member slidable to cover and uncover one of said ports thereby to control the flow of fluid therethrough, a flow restricting device disposed in the path of fluid controlled by said valve, and means for applying a biasing force to said valve member variable in accordance with the difference in pressures on the upstream and downstream sides of said flow restricting device to compensate for valve reaction, and means for by-passing an adjustable amount of fluid around said flow restricting device to vary the amount of compensation.

3. In a control valve, a stationary member having a port therein adapted to be connected to a source of fluid under pressure and a second port adapted to be connected to a pressure-operated device, a valve member movable to cover and uncover said first-mentioned port and thereby control flow of fluid therethrough, a flow-restricting device disposed in the path of fluid flow controlled by said valve member, and piston means responsive to the difference in pressure on the upstream and downstream sides of said flow-restricting device, said piston means constructed and arranged to apply a biasing force to said valve member to compensate for valve reaction, a by-pass interconnecting the upstream and downstream sides of said flow restricting device and an adjustable valve disposed in said by-pass for varying the pressure differential applied to said piston means.

4. In a fluid control valve, a sleeve having a cylindrical bore and a port in communication with said bore, a valve member axially slidable in said bore to control flow of fluid through a port in said sleeve member, means for continuously rotating said valve member to reduce static friction, a flow restricting device disposed in the path of fluid controlled by said valve member and means for applying a biasing force to said valve member proportional to the difference in fluid pressures on the upstream and downstream sides of said flow restricting device to compensate for valve reaction whereby said valve member may be positioned by external control forces of small magnitude.

5. A fluid flow velocity reaction compensated hydraulic servo-control valve comprising a valve body with a cylindrical bore therein, a valve member including a stem and a plurality of lands reciprocable within said bore, said valve body including an inlet port in the central portion thereof opening into said valve bore and adapted for connection to a source of high pressure hydraulic fluid, said valve member including a central valve land normally positioned to close said inlet port and movable with said valve member in either direction away from a central position to open said inlet port, symmetrical valve structure on each side of said central port and central land including an end land on said valve member closing said valve bore at its respective axial position, a hydraulic fluid flow restricting annulus positioned within said valve bore surrounding said valve stem between said central and end lands, said body including an outlet port opening from said valve bore at a position between said annulus and said end land for connection to a hydraulic fluid utilization device, said body also including a drain or return port adapted for connection to a hydraulic return line, said return port being closable by said end land except when said central land opens said central inlet port for the admission of hydraulic pressure fluid to the opposite end of said servo-valve.

6. A fluid flow velocity reaction compensated hydraulic servo-control valve comprising a body with a cylindrical bore therein, a valve member including a stem and a plurality of lands reciprocable within said bore, said valve body including an inlet port in the central portion thereof opening into said valve bore and adapted for connection to a source of high pressure hydraulic fluid, said valve member including a central valve land normally positioned to close said inlet port and movable with said valve member in either direction away from a central position to open said inlet port, symmetrical valve structure on each side of said central port and central land including an intermediate and an end land on said valve member each closing said valve bore at its respective axial position, said valve body including ports and a passageway providing a circuitous path for hydraulic fluid flowing through the valve bore from said central inlet port around said intermediate land and back into said valve bore, a hydraulic fluid flow restricting annulus positioned within said valve bore surrounding said valve stem between said intermediate and end lands, said body including an outlet port opening from said valve bore at a position between said annulus and said end land for connection to a hydraulic fluid utilization device, said body also including a drain or return port adapted for connection to a hydraulic return line, said return port being closable by said end land except when said central land opens said central inlet port for the admission of hydraulic pressure fluid to the opposite end of said servo-valve.

HOWARD W. AVERY.

REFERENCES CITED

The following references are of record in the file of this patent:

UNITED STATES PATENTS

| Number | Name | Date |
|---|---|---|
| 1,490,654 | Wylie | Apr. 15, 1924 |
| 1,908,396 | Albright | May 9, 1933 |
| 2,083,774 | Campbell | June 15, 1937 |
| 2,167,837 | Hall | Aug. 1, 1939 |
| 2,365,748 | Curtis | Dec. 26, 1939 |